US008591743B2

(12) United States Patent
Schneider

(10) Patent No.: US 8,591,743 B2
(45) Date of Patent: Nov. 26, 2013

(54) PORTABLE SYSTEM FOR ON-SITE IODINE EXTRACTION FROM AN AQUEOUS SOLUTION

(76) Inventor: Charles A. Schneider, Villa Hills, KY (US)

( * ) Notice: Subject to any disclaimer, the term of this patent is extended or adjusted under 35 U.S.C. 154(b) by 0 days.

(21) Appl. No.: 13/275,662

(22) Filed: Oct. 18, 2011

(65) Prior Publication Data

US 2012/0034152 A1    Feb. 9, 2012

Related U.S. Application Data

(62) Division of application No. 12/617,346, filed on Nov. 12, 2009.

(51) Int. Cl.
*C02F 1/28* (2006.01)
*C02F 1/76* (2006.01)

(52) U.S. Cl.
USPC ........... 210/668; 210/669; 210/673; 210/683; 210/756; 210/758; 423/501; 423/502; 423/503; 423/504

(58) Field of Classification Search
USPC ................. 210/664, 668, 669, 670, 673, 683, 210/747.7, 747.8, 748.2, 758, 192, 756; 423/501–504
See application file for complete search history.

(56) References Cited

U.S. PATENT DOCUMENTS

| | | | |
|---|---|---|---|
| 1,774,882 A * | 9/1930 | Girvin | 423/503 |
| 4,043,539 A | 8/1977 | Gilmer et al. | |
| 4,533,123 A | 8/1985 | O'Leary | |
| 5,814,230 A * | 9/1998 | Willis et al. | 210/748.01 |
| 5,882,486 A * | 3/1999 | Moore, Jr. | 210/295 |
| 2006/0113257 A1* | 6/2006 | Fernandez et al. | 210/756 |
| 2010/0074836 A1* | 3/2010 | Brix et al. | 423/500 |

FOREIGN PATENT DOCUMENTS

WO    WO 2010/033945 A1    3/2010

OTHER PUBLICATIONS

XP-002593228, A. Lauterbach, G. Ober, Iodine and Iodine Compounds, Kirk-Othmer Encyclopedia of Chemical Technology, Jul. 13, 2001, pp. 6-9, vol. 14, retrieved from the internet: URL:http://mrw.interscience.wiley.com/emrw/9780471238966/kirk/article/iodilaut.a01/current/pdf, retrieved on Jul. 22, 2010.
Annex to Form PCT/ISA/206, Communication Relating to the Results of the Partial International Search, PCT/US2009/064213, 2 pages.
PCT International Search Report, International Application No. PCT/US2009/064213, International Filing Date Nov. 21, 2009, 7 pages.

* cited by examiner

*Primary Examiner* — Lucas Stelling
(74) *Attorney, Agent, or Firm* — Fay Sharpe LLP

(57) ABSTRACT

A portable system for extracting iodine from brine on-site is disclosed. The portable system includes a mobile platform containing a treatment unit for oxidizing iodine ions into elemental iodine, an adsorption unit capable of binding iodine, and may also have an electrolytic cell and/or a gas-liquid separator. The treatment unit and the adsorption unit may be located in the same or different portable operating devices. When transported to a field site containing natural gas wells, the natural gas wells provide a fluid stream containing natural gas and brine. The separators can separate the natural gas from the brine, and the brine is then run through the treatment unit and the adsorption unit to bind iodine present in the brine. The brine is then returned to the natural gas well. Upon saturation, the portable operating device is transported to a second location, where iodine is extracted from the adsorption unit.

11 Claims, 10 Drawing Sheets

PORTABLE SYSTEM FOR ON-SITE IODINE EXTRACTION FROM AN AQUEOUS SOLUTION

This application is a divisional application claiming the priority benefit of U.S. application Ser. No. 12/617,346, filed Nov. 12, 2009, the disclosure of which is incorporated herein by reference.

BACKGROUND

The present disclosure relates to a portable system which is especially suitable for use in extracting iodine from an aqueous solution containing soluble iodine ions, such as brine.

Elemental iodine is a valuable chemical having many industrial and medicinal applications. There is an increasing demand for iodine and its major derivatives, iodide salts. The consumption of iodine and iodide salts is distributed among several industrial applications, such as catalysts, animal feed additives, stabilizers for nylon resins, inks and colorants, pharmaceuticals, disinfectants, film, and other uses. Much attention is therefore focused on the recovery of iodine from various sources, either as a primary product or as a by-product of other industrial processes.

Iodine recovery is generally carried out by physical or chemical manipulation of an aqueous solution containing soluble ions of iodine. Exemplary solutions include leaching solutions used in nitrate extraction and brine solutions. The term "brine" in this context includes industrial and naturally occurring salt solutions containing iodine in various salt forms. Exemplary brines are seawater and natural brines such as those associated with petroleum deposits and with solution mining of salt domes.

The United States accounts for only 5% of global production, and domestic producers of iodine supply only about 28% of domestic demand, with the remainder being imported.

Iodine has been isolated from gas well brine for over 80 years in various fields in Japan and Oklahoma. The brine is pumped from a number of gas wells over many miles to a centralized processing facility. In that facility, the iodide rich brine is acidified and oxidized to obtain elemental iodine ($I_2$). In Japan, the iodine is then adsorbed, for example using anion exchange resins or carbon, to concentrate the iodine. The adsorption media is then "stripped" of iodine by a number of techniques. In Oklahoma, the iodine is recovered from a "blow out tower" where the iodine is vaporized by heat and an air stream blowing through the oxidized brine condenses the vaporized iodine as a solid that is recovered. In either case, the leftover brine, with iodine removed, is then sent back to the field and typically injected back into the ground.

High capital expenditures (in the tens of millions of dollars) are associated with a centralized processing facility. There is also substantial investment in each gas well, which is typically drilled to a depth of about 2,000 meters, and in the pipeline needed to carry the brine over a distance of many miles from the gas well to the centralized processing facility. High risk is also present because the brine production capacity of a gas well is unknown at the time the capital expenditure needs to be made. A gas well may produce for only a year, which reduces the return on investment. However, a better model has not yet been implemented in the past 80 years.

It would be desirable to provide a system that can reduce capital expenditures and provide safe, economical iodine extraction from such natural brines.

BRIEF DESCRIPTION

Disclosed in various embodiments is a portable system for on-site iodine extraction from an aqueous solution containing iodine, such as brine. Also disclosed are methods of using such portable systems to extract iodine from brine.

In embodiments, a portable system for on-site iodine extraction is disclosed which comprises: a mobile platform; a treatment unit capable of oxidizing iodine ions in a solution into elemental iodine; and an adsorption unit capable of adsorbing iodine. The treatment unit and the adsorption unit are contained upon or within the mobile platform.

The treatment unit and the adsorption unit can be located in a common portable operating device, or in separate portable operating devices.

The mobile platform may be a box trailer having a length of 45 to 53 feet.

The treatment unit may include a sand filter. The treatment unit may also include an electrolytic cell to be used in oxidizing iodide.

The treatment unit may include an in-line mixing apparatus comprising: an outer tube comprising a sidewall, a closed end, and an open end; an inner tube comprising an inlet end, a closed end, and a sidewall, the sidewall having openings therein, the inner tube being located inside the outer tube; a first feed tube in fluid communication with the inner tube inlet end; and an exit tube connected to the open end of the outer tube.

The adsorption unit can be an anion exchange resin or an activated coconut carbon column.

In some embodiments, a method of extracting iodine from a fluid stream comprises providing a portable operating device to a first location, the portable operating device comprising a mobile platform, a treatment unit capable of oxidizing iodine ions in a solution into elemental iodine, and an adsorption unit capable of adsorbing iodine; and the first location providing at least one fluid stream containing iodine. The at least one fluid stream is passed through the treatment unit and the adsorption unit to accumulate the iodine in the adsorption unit, i.e. to bind the iodine present in the at least one fluid stream. The adsorption unit is then transported to a second location, and iodine is extracted from the adsorption unit at the second location.

The at least one fluid stream containing iodine can be provided by a separator capable of separating natural gas from brine. The fluid stream may alternatively be a brine stream.

The adsorption unit may comprise an anion exchange resin or an activated coconut carbon column. The portable operating device may have a plurality of such adsorption units capable of binding iodine.

The at least one fluid stream can be returned to the first location after being passed through the adsorption unit.

In embodiments, the first location is owned by a first party and the portable operating device is owned by a second party. The second location can also be owned by the second party.

The method may further comprise dividing the at least one fluid stream into a first portion and a second portion. The first portion is passed through an electrolytic cell to form sodium hypochlorite. The first portion, the second portion, and an acid are then re-combined together into a fluid stream, which oxidizes iodide ions to elemental iodine. The fluid stream is then sent to the treatment unit where the adsorption of iodine is accomplished.

The iodine in the adsorption unit can be extracted by passing an oxidizing solution through the adsorption unit to obtain elemental iodine. Alternatively, a reducing gas or solution, such as sulfur dioxide gas and water, is passed through the adsorption unit to convert the elemental iodine back into iodide ions. Hydrogen iodide, for example, can be obtained after addition of a reducing solution. The hydrogen iodide is then oxidized to obtain elemental iodine.

These and other non-limiting aspects of the present disclosure are more particularly described below.

BRIEF DESCRIPTION OF THE DRAWINGS

The following is a brief description of the drawings, which are presented for the purpose of illustrating the exemplary embodiments disclosed herein and not for the purpose of limiting the same.

DETAILED DESCRIPTION

Figure 1:
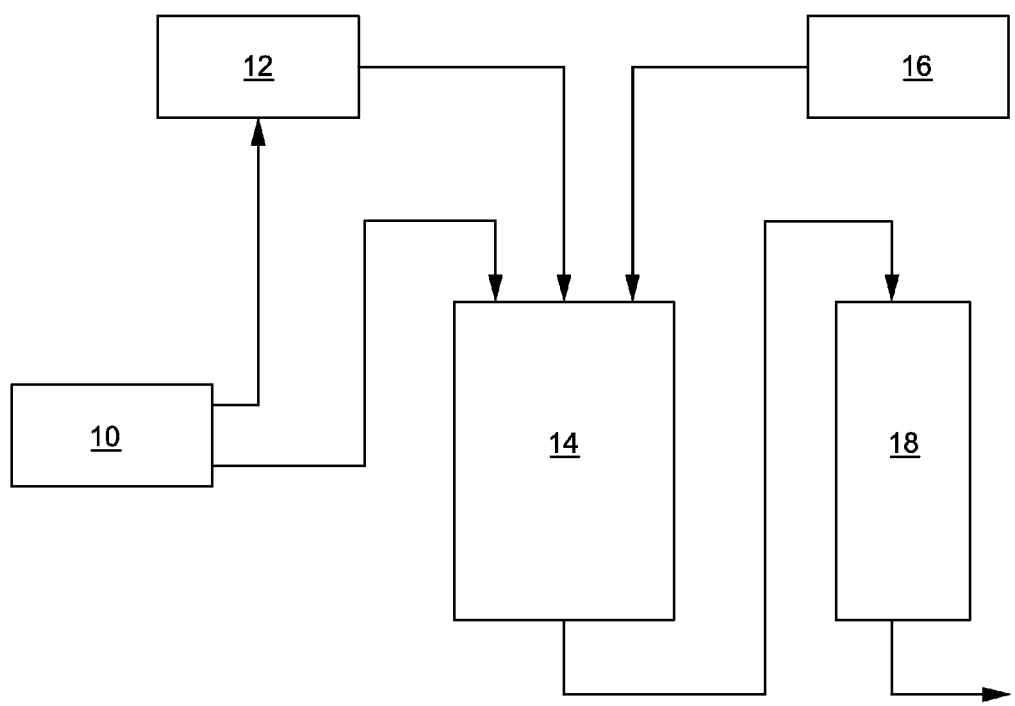
FIG. 1 is a flowchart showing an exemplary method useful in the present disclosure.

A more complete understanding of the components, processes, and apparatuses disclosed herein can be obtained by reference to the accompanying figures. These figures are merely schematic representations based on convenience and the ease of demonstrating the present development and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

The term "iodine" can refer to iodine in all of its various forms, including diatomic iodine or elemental iodine ($I_2$), iodide ($I^{1-}$), and iodate ($IO_3^{1-}$).

The apparatuses described herein are suitable for extracting iodine from brine. FIG. 1 is a flowchart showing a method of iodine extraction that is suitable for use herewith. Brine is transferred from a brine source 10 to an electrolytic cell 12 and a reactor 14. The transfer may occur using an aqueous solution under pressure, such as when the brine source 10 is an artesian well, or the brine may be pumped. Preferably, the brine is filtered to remove dirt particles and other filterable impurities before reaching the electrolytic cell 12 and reactor 14.

The electrolytic cell 12 receives brine from the brine source 10. Sodium chloride and water in the brine react in the electrolytic cell to produce sodium hypochlorite, commonly known as bleach and useful here as an oxidant, according to the following equations:

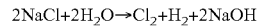
$$2NaCl + 2H_2O \rightarrow Cl_2 + H_2 + 2NaOH$$

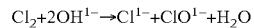
$$Cl_2 + 2OH^{1-} \rightarrow Cl^{1-} + ClO^{1-} + H_2O$$

The amount of NaOCl produced is controlled by a combination of the amperage of the electrolytic cell and the flow rate of brine through the electrolytic cell 12.

Three different fluids then enter the reactor 14: brine, NaOCl, and acid 16. Brine from the brine source 10 and brine containing NaOCl from the electrolytic cell 12 combine in the reactor 14. Iodide in brine is oxidized by NaOCl to produce elemental iodine according to the following equation:

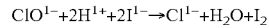
$$ClO^{1-} + 2H^{1+} + 2I^{1-} \rightarrow Cl^{1-} + H_2O + I_2$$

The production of iodine is monitored, for example by using a spectrophotometer. Elemental iodine is colored, and absorbance may be measured at 430 nm. A user may manually adjust the amperage of the electrolytic cell, controlling the amount of NaOCl reaching the reactor, to maximize the production of iodine. Alternatively, an automated controller or computer system may adjust the amperage of the electrolytic cell based on the measured absorbance of elemental iodine to maximize the production of elemental iodine with minimal or no human intervention.

The acid maintains the reactor pH between 6.0 and 6.8 by adjustment. Acid is provided by the pH unit 16, which is a tank containing acid with a pump to transfer the acid to the reactor 14. In embodiments, the acid is hydrochloric acid or sulfuric acid. In particular embodiments, the acid is dilute hydrochloric acid.

Brine containing elemental iodine is transferred from the reactor 14 to an iodine adsorption column 18. A single column or multiple columns can be used. Multiple columns may be connected in series, in parallel, or a combination of both.

In embodiments, the iodine adsorption column is an anion-exchange column containing a basic resin. Iodine in the brine is adsorbed by the resin. Brine containing elemental iodine is run through the resin until the resin is saturated with iodine and iodine can be detected in the eluent.

Elemental iodine may be recovered from the saturated resin by conventional techniques. One such technique of recovering iodine from a saturated resin is by elution with aqueous sodium hydroxide. For example, an aqueous solution containing about 10% sodium hydroxide may be passed through the column at a temperature of 55 to 65° C., preferably 60° C. Approximately 1-1.5 gallons of sodium hydroxide solution may be used for each pound of saturated resin. The resin is then regenerated to be reused. In particular embodiments, the resin is regenerated by running a solution containing 10% sodium chloride and 0.33% NaOCl, adjusted to slightly acidic with hydrochloric acid, through the resin.

Iodine may be recovered from the sodium hydroxide and sodium chloride eluents by conventional techniques. Once such technique is to combine the eluents and acidify the mixture to a pH of about 0.5 to about 3 with hydrochloric acid, preferably a pH of 0.75. The mixture is then oxidized with NaOCl to form iodine precipitate.

Alternatively, the iodine adsorption column 18 may be a column containing activated coconut carbon particles. Again, the brine containing iodine is run through the column until the activated coconut carbon is saturated and iodine can be detected in the eluent.

The saturated column is then treated with sulfur dioxide gas ($SO_2$) and water ($H_2O$) to extract the iodine. This treatment removes the iodine from the pores of the activated carbon particles, and the resulting products are hydrogen iodide (HI) and sulfuric acid ($H_2SO_4$). The hydrogen iodide can then be oxidized, for example with hydrogen peroxide, to obtain elemental iodine ($I_2$). These reactions are illustrated below:

$$I_2+SO_2+2H_2O \rightarrow 2HI+H_2SO_4$$

$$2HI+H_2O_2 \rightarrow I_2+2H_2O$$

Figure 2:
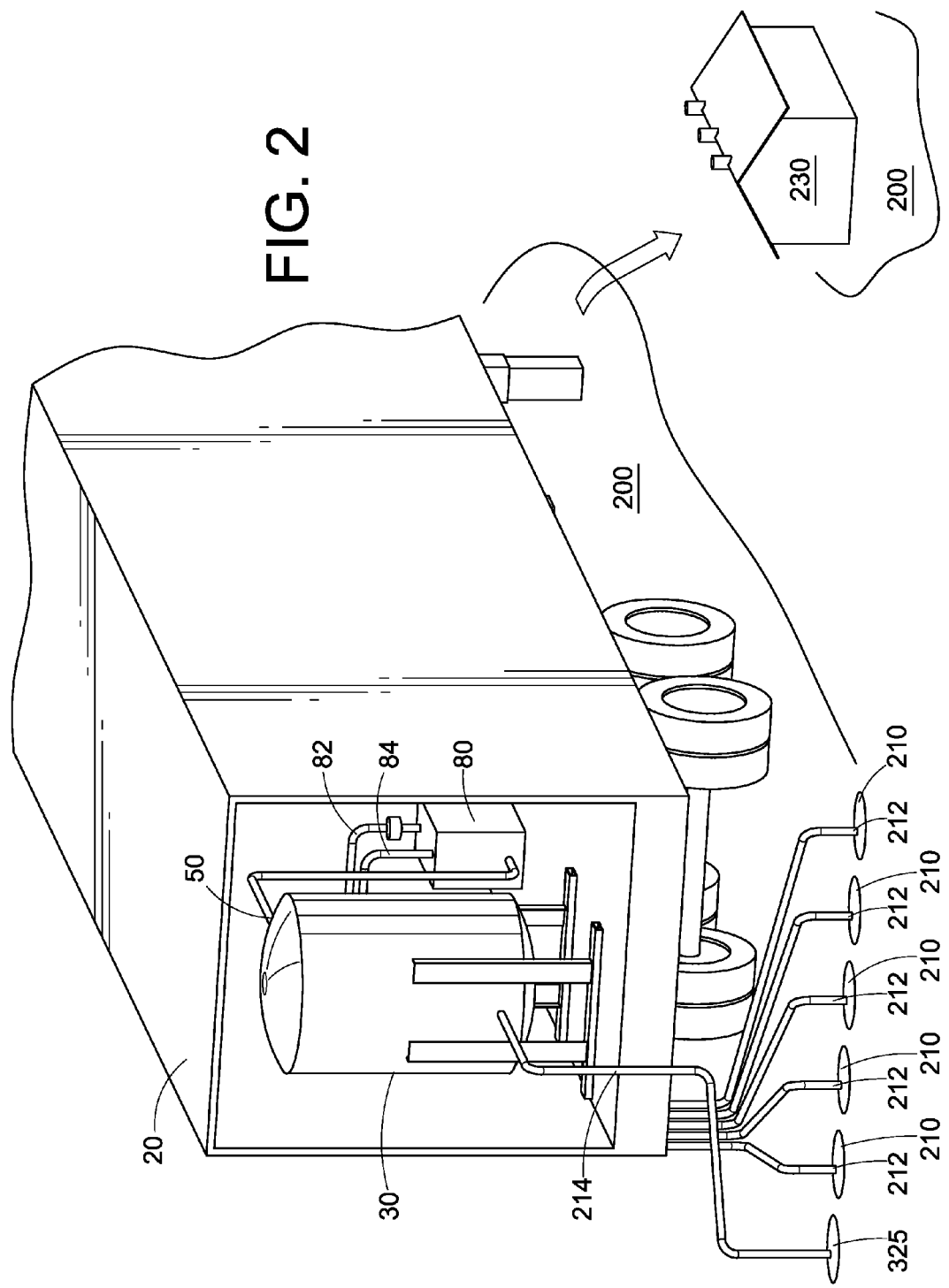
FIG. 2 shows some aspects of the portable system of the present disclosure.

A schematic diagram of the portable system of the present disclosure is shown in FIG. 2. A portable system 20 is provided that has the ability to extract iodine from a fluid stream, such as brine. The portable system 20 may include one or more portable operating devices 30. The portable system is transported to a first location 200. The first location provides at least one fluid stream containing iodine. As depicted here, the first location 200 includes a plurality of natural gas wells 210 clustered together. In contrast to typical gas wells from which brine is extracted, the natural gas wells may be relatively shallow, going down only about 1,500 feet (~460 meters). A feed line 212 extends from each gas well 210 to the portable system 20. The portable operating device 30 contains an iodine storage means, such as an iodine adsorption column capable of binding iodine. The extracted brine, having a lower iodine concentration can be returned to the ground through return line 214. For example, the extracted brine can be re-injected into the ground.

Upon saturation of the iodine storage means, the portable system 20 or the portable operating device 30 is transported to a second location 220, such as a stripping or processing facility 230. There, the iodine is extracted from the portable system 20 or portable operating device 30. The portable system or portable operating device can then be reused.

In particular, leasing transactions are considered by this disclosure. It is contemplated that the portable system 20 and/or processing facility 230 are owned by one party for use by another party which owns the rights to the natural gas wells 210 and/or the first location 200.

Figure 3:
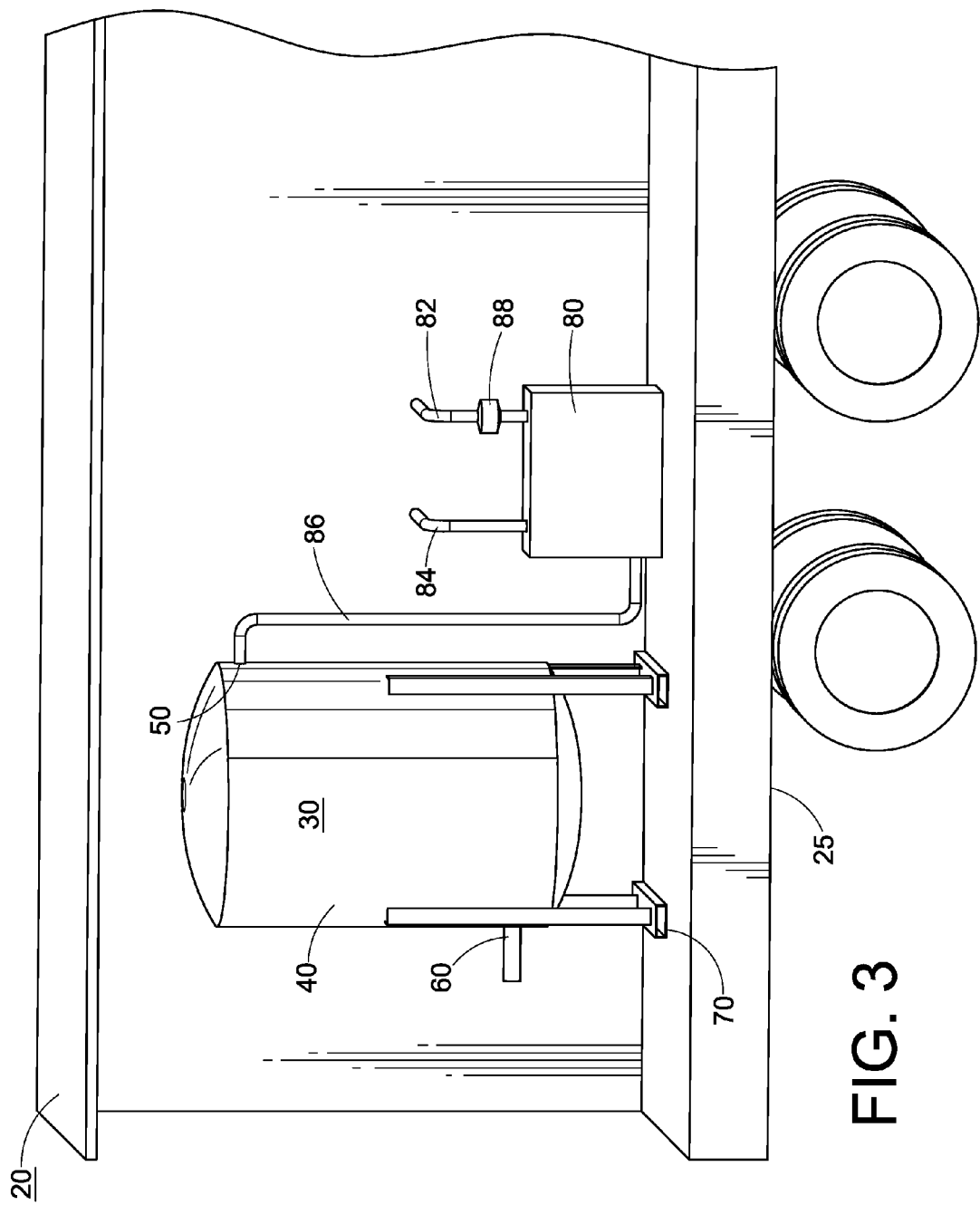
FIG. 3 is an exemplary portable system of the present disclosure.

An exemplary embodiment of the portable system of the present disclosure is shown in FIG. 3. The system 20 here is depicted as including a mobile platform 25, such as a standard box trailer or semi-trailer which can be towed by an articulated truck or rig and within which the other components of the portable system can be located and transported. Box trailers have common widths of 8 feet and 2.6 m (8 ft, 6.4 inches). They also have standard lengths, and this disclosure contemplates the use of trailers having a length of 45 to 53 feet. The box trailer is depicted here as being mounted on wheels. It is also contemplated that skids may be sufficient to impart mobility.

Located upon or within the mobile platform are one or more portable operating devices 30. The portable operating device 30 includes a body 40, at least one inlet 50, and at least one outlet 60 for connecting various hoses to the portable operating device. As depicted, the portable operating device also includes a stand system 70 that supports the body 40 and allows the portable operating device to be moved by a standard forklift.

In implementing the methods described above in FIG. 2, the portable system may also include an electrolytic cell. Depending on the various embodiments, an electrolytic cell can be included within a portable operating device 30 (see FIG. 4) or as a separate apparatus included in the overall portable system 20.

The portable system may also include a gas-liquid separator 80 for use in case the provided fluid stream is the raw natural gas-brine fluid extracted from, for example, a natural gas well. The natural gas is separated from the brine, and the brine is then processed to extract iodine from it. As depicted here, separator 80 receives fluid stream 82 and separates it into natural gas stream 84 and brine stream 86. The brine stream 86 is fed into portable operating device 30.

The fluid stream provided by the gas well is generally filtered to remove unwanted debris. A filter 88 can be located, for example, prior to fluid entering the separator 80. A filter 56 could also be located within the portable operating device 30 (see FIG. 4). The type of filter is not critical: it may be, for example, a cartridge filter, a bag filter, or a sand filter. Generally, a sand filter is most desirable.

The portable system of the present disclosure comprises (i) a treatment unit that is capable of oxidizing iodine ions present in the brine into elemental iodine. Put another way, the treatment unit produces elemental iodine from iodide ions. The portable system also comprises (ii) an adsorption unit capable of adsorbing iodine, such as an iodine adsorption column. The treatment unit and the adsorption unit can be located in a common portable operating device 30, or they can be located in two separate portable operating devices.

Figure 4:
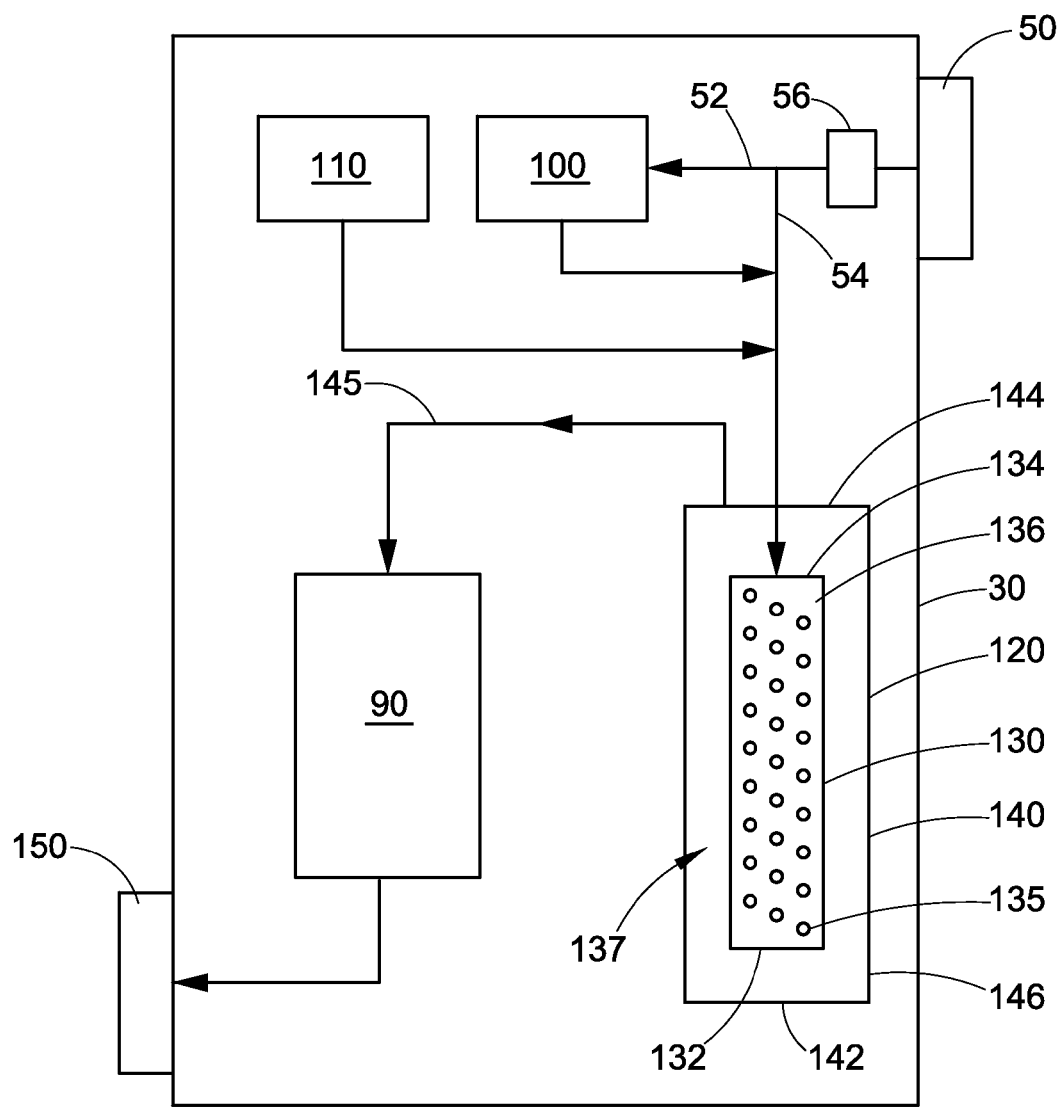
FIG. 4 is a diagram of a first exemplary portable operating device of the present disclosure.

FIG. 4 is a diagram of a first exemplary portable operating device 30. Brine is provided to the portable operating device 30 via inlet 50 and flows through filter 56. Brine can be divided into a first portion 52 and a second portion 54. The first portion is passed to electrolytic cell 100, which produces sodium hypochlorite or bleach (NaOCl) from the first portion. Acid 110 is also provided, either from an internal tank in the portable operating device or from an outside feed. The second portion of brine 54 now containing NaOCl, the first portion of brine 52, and acid 110 are subsequently fed to the treatment unit 120.

In FIG. 4, the treatment unit 120 is an in-line mixing apparatus comprising an inner tube 130 and an outer tube 140. The inner tube comprises an inlet end 134, a closed end 132, and a sidewall 136. Openings 135 are present in the sidewall of the inner tube. There may also be openings in the closed end 132 of the inner tube 130. The outer tube comprises a sidewall 146, a closed end 142, and an open end 144. The brine/NaOCl/acid mixture is fed to the inner tube 130 under pressure, supplied for example by a pump (not shown) or by natural artesian pressure. The fluids then flow out the openings 135 into the annular volume 137 under pressure. It should be kept in mind that during constant operation, annular volume 137 is full of solution as well. The resulting cascade of fluid being expelled from the inner pipe 130, combined with impingement against the outer pipe 140 and turbulence due to fluid flowing from bottom end 142 upwards causes thorough mixing to occur throughout the volume of fluid. Put another way, the initial downward flow of the solution in the inner tube 130 is continually and abruptly changed as the solution flows out the openings 135, wherein they encounter a counter-current upward flow in the annular volume 137. Each of the flow streams exiting the inner tube through openings 135 experiences continuous, instantaneous, and massive flow shear as a result, causing intimate mixing with little plug flow or laminar flow. In particular, the degree of mixing is much better than the conventional route, where the brine, NaOCl, and acid are simply poured into a common tank and then agitated. The mixing results in the formation of elemental iodine ($I_2$). The mixed fluid rises through the outer tube 140 and exits through exit tube 145. The brine solution, now containing elemental iodine, then passes to iodine adsorption unit 90, where the iodine is adsorbed and stored inside the portable operating device 30. The remaining brine, now having a lower iodine concentration, exits the portable operating device through outlet 150.

Figure 5:
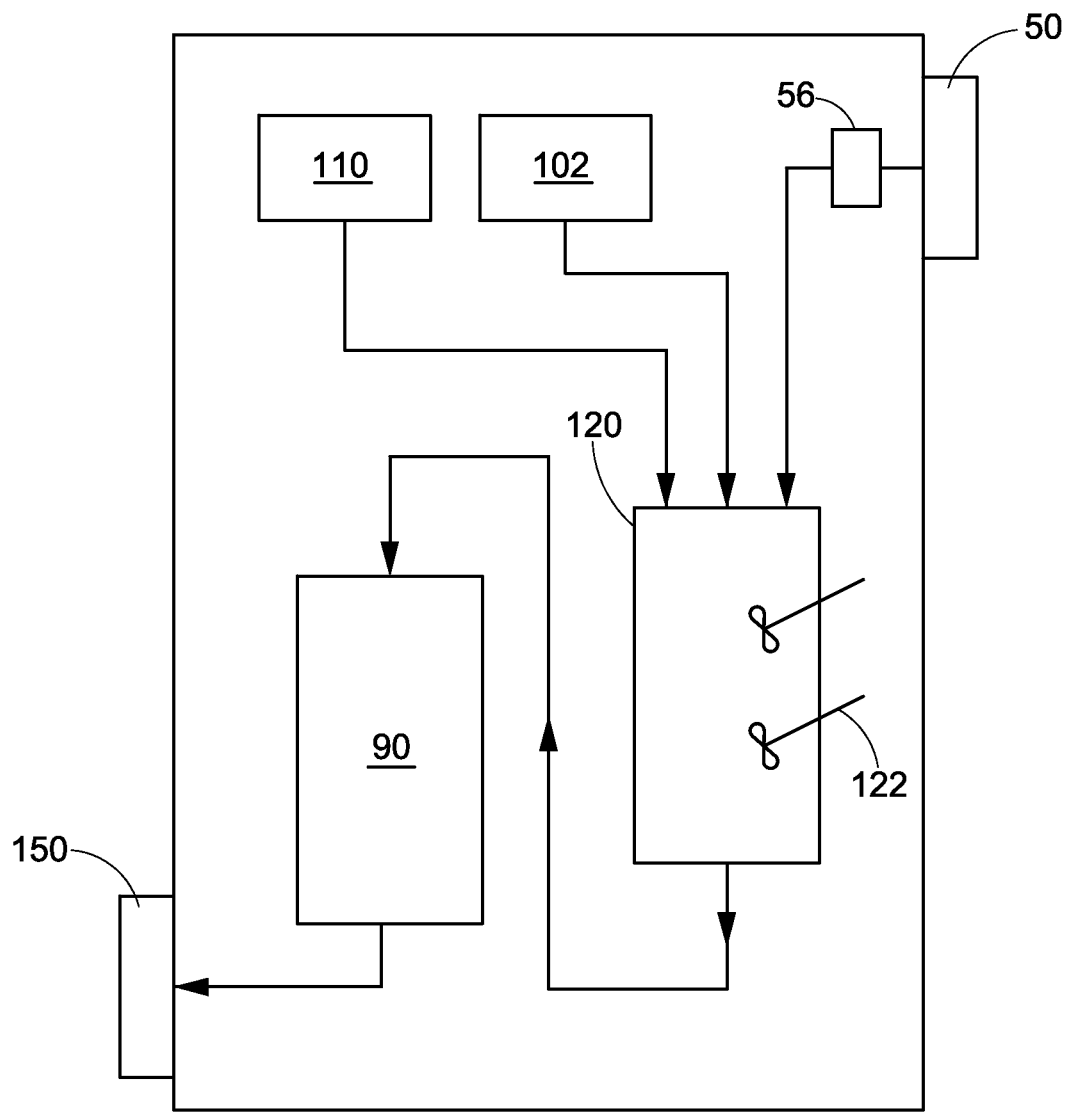
FIG. 5 is a diagram of a second exemplary portable operating device of the present disclosure.

FIG. 5 is a diagram of a second exemplary portable operating device 30. Generally, this device is the same as that shown in FIG. 4, with two exceptions. First, NaOCl may be formed as in FIG. 4, i.e. by passing some brine through an electrolytic cell, or NaOCl can simply be added from a tank or external feed 102. Second, the treatment unit 120 is shown here as a closed tank containing an agitator 122. Brine, acid, and NaOCl are continuously fed to the closed tank and mixed by agitation, then sent to iodine adsorption unit 90.

Figure 6:
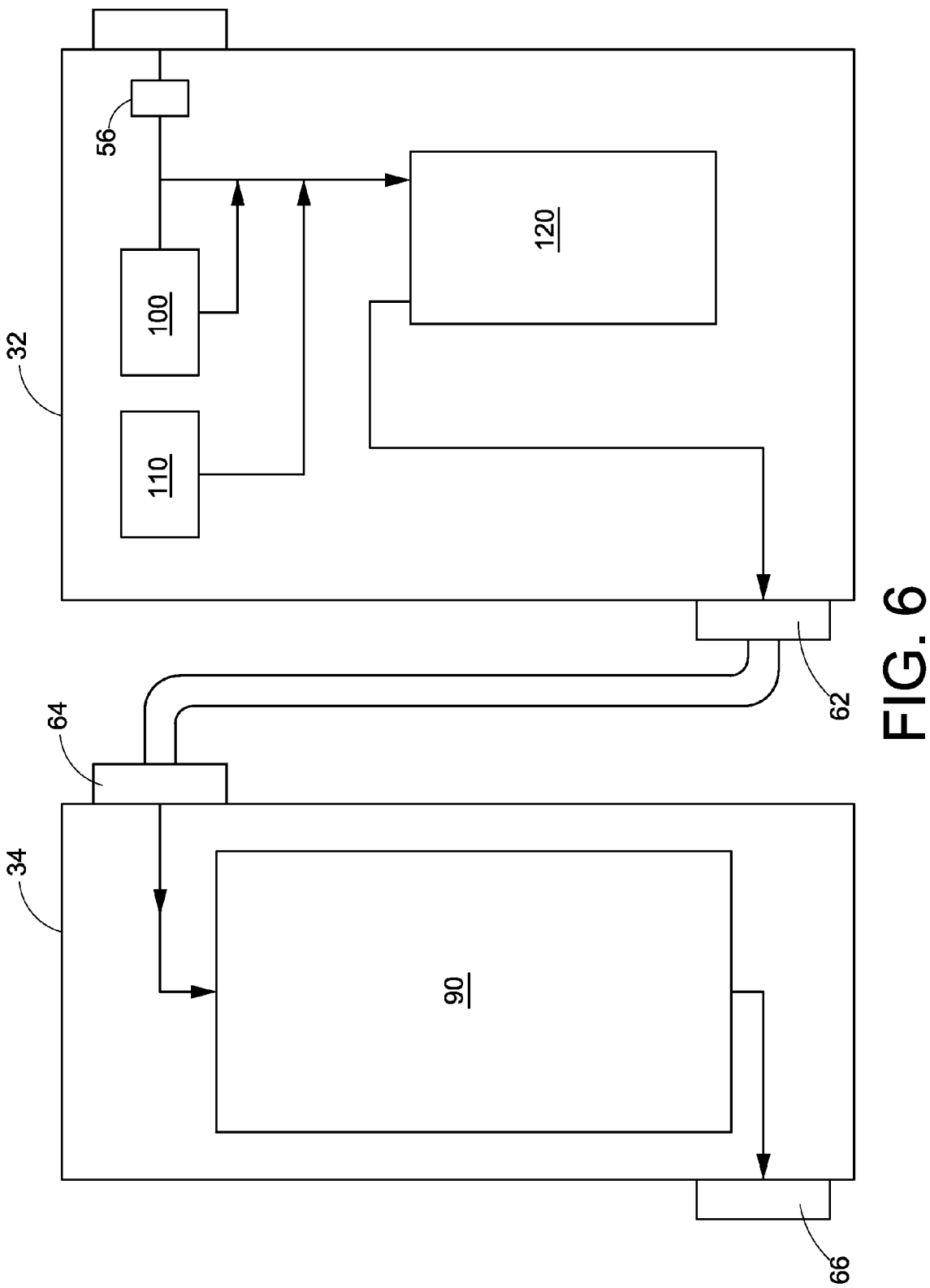
FIG. 6 is a diagram of an alternative embodiment of the portable system of the present disclosure.

FIG. 6 is a diagram of an alternative embodiment of the portable system. In this embodiment, the treatment unit 120 is located in a first portable operating device 32 or "preparatory" device, and the adsorption unit 90 is located in a second portable operating device 34 or "collection" device. Here, the brine enters the preparatory device 32 and is oxidized to form elemental iodine. The brine then exits preparatory device 32 through outlet 62 and is passed to collection device 34 through inlet 64. The iodine is adsorbed and removed from the brine by adsorption unit 90. The leftover brine then exits the preparatory device through outlet 66. It is contemplated here that the preparatory device could remain on-site near the gas wells, i.e. semi-fixed in one position. As each collection device is filled, a new one is attached to the preparatory device and the collection device saturated with iodine is sent to a stripping facility to extract the iodine. When the iodine concentration at the gas well location falls too low, the portable system with the preparatory device can then be moved to a new location.

The adsorption unit is capable of adsorbing iodine. Exemplary adsorption units include anion-exchange resins and activated carbon columns.

In particular embodiments, the iodine adsorption unit 90 contains activated carbon particles that adsorbs the iodine ions. The activated carbon may be produced from any carbon-rich material such as coconut shell, wood, coal, peat, eucalyptus, saw dust, rice husk, and lignite. In particular embodiments, the activated carbon particles are coconut carbon particles. It has been discovered that coconut carbon particles are more efficient/effective than activated carbon produced from wood or coal. Coconut carbon particles have a superior hardness compared to other activated carbon particles. In addition, without being bound by theory, it is believed that coconut carbon particles possess more micropores than other activated carbon particles. Micropores are pores with a diameter of less than 2 nanometers. In contrast, mesopores have a diameter of from 2 to 25 nanometers and macropores have a diameter of greater than 25 nanometers. It is believed that the small size of the pores in the coconut carbon particles prevents the adsorption of larger molecules that would otherwise lower the efficiency of the activated carbon particles. This size discrimination based on the pore size also improves the yield of the overall process.

The activated carbon particles then absorb iodine ions from the brine into its pores. The specific chemistry is not known, for example whether the pores adsorb iodide ions or elemental iodine, and is not relevant here. The pH of the brine solution may be controlled during the process. In some embodiments, pH is kept between about 5.5 and about 6.5. Keeping the pH within this range inhibits higher oxidative states.

Figure 7:
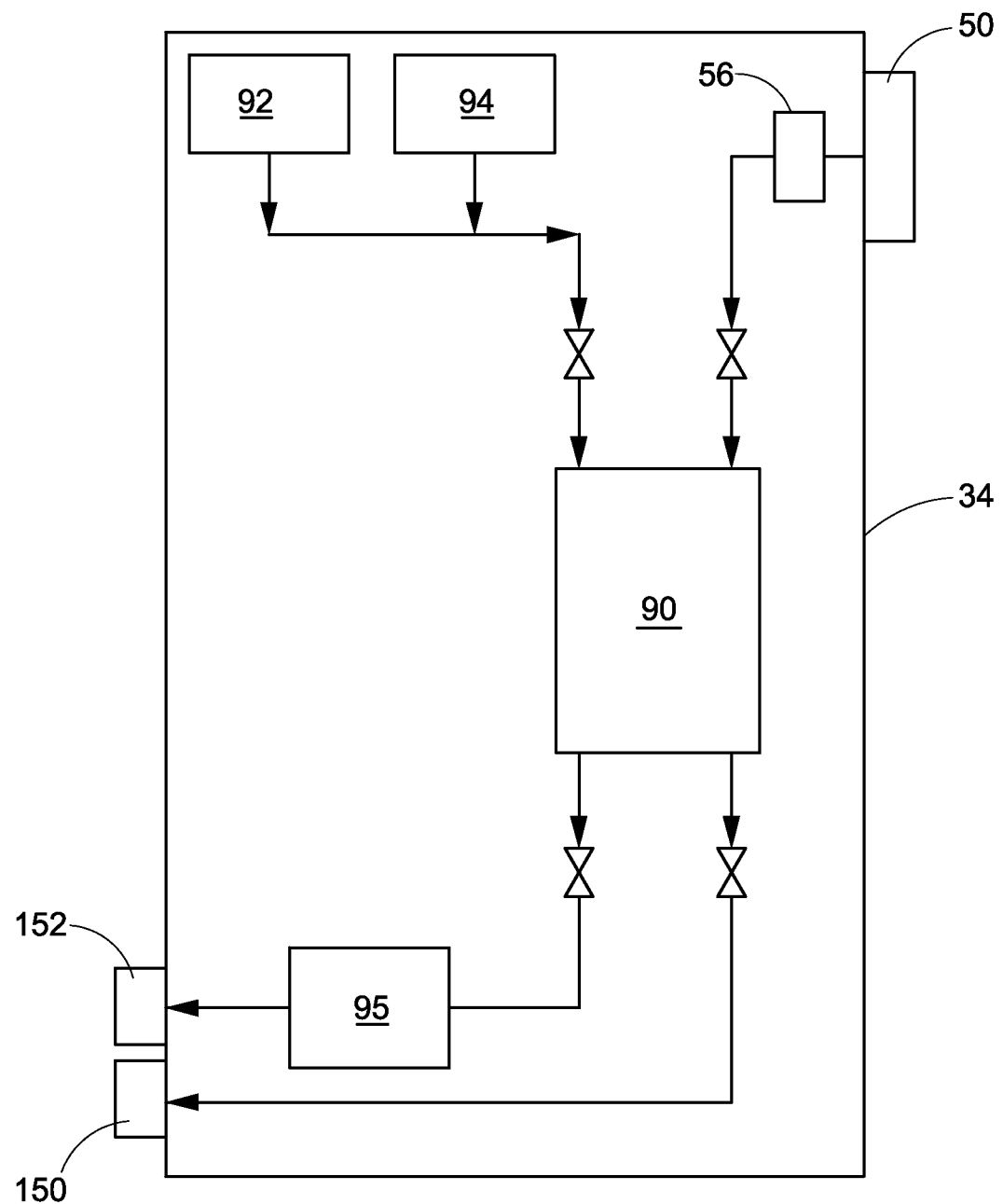
FIG. 7 is a diagram showing an alternative storage method in a third portable operating device of the present disclosure

If desired, the iodine can be stored in the activated carbon column. However, this embodiment also allows for an alternative storage method. As seen in FIG. 7, upon saturation with iodine, the activated carbon particles in column 90 can be treated with sulfur dioxide gas ($SO_2$) 92 and water ($H_2O$) 94. This treatment removes the iodine from the pores of the activated carbon particles. The resulting products are hydrogen iodide and sulfuric acid. The activated carbon particles, now having vacant pores, can be recycled for continued exposure to iodine-saturated brine. The hydrogen iodide and sulfuric acid form a reducing solution, and this solution is stored in storage tank 95. The chemical reaction is shown below:

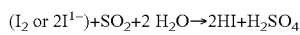

The remaining brine, now having a lower iodine concentration, exits through outlet 150. If desired, the reducing solution in storage tank 95 could be collected through a separate outlet 152.

The internal structure of the portable operating device 30 can vary as desired. For example, the portable operating device may include multiple treatment units 120, either in series or in parallel, or the portable operating device may include multiple iodine adsorption units 90, again either in series or in parallel. When the treatment unit and adsorption unit are in separate devices, as in FIG. 6, each unit may be one large unit (e.g. one large carbon column) or several smaller units (e.g. several small carbon columns).

Several different methods of transport are contemplated. When the treatment unit and the adsorption unit are located in a common portable operating device, the device 30 can be transported between the first location 200 and the second location 220. Alternatively, the collection devices 34 can be transported to the second location 220 while the preparatory device 32 remains on-site at the first location 200. In some embodiments, it is contemplated that the portable operating devices 30 are mounted to the mobile platform, while in others they can be separated from the mobile platform, e.g. so the collection device 34 can be transported separately while the preparatory device remains on-site.

At the second location 220, a processing facility 230 is available for extracting the iodine from the portable system 20 or portable operating device 30. Iodine may be recovered from the adsorption unit 90 by the techniques described above with regards to FIG. 1. If iodine is stored in an activated carbon column, the activated carbon particles can now be treated with sulfur dioxide gas ($SO_2$) and water ($H_2O$) to remove the iodine from the pores of the activated carbon particles and obtain hydrogen iodide and sulfuric acid. The hydrogen iodide can then be oxidized to form elemental iodine, usually in the form of crystals. The oxidizing reactant can be, for example, chlorine or chloride, as shown in the following reaction:

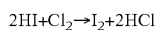

Finally, the elemental iodine can be separated, for example by filtration.

Figure 8:
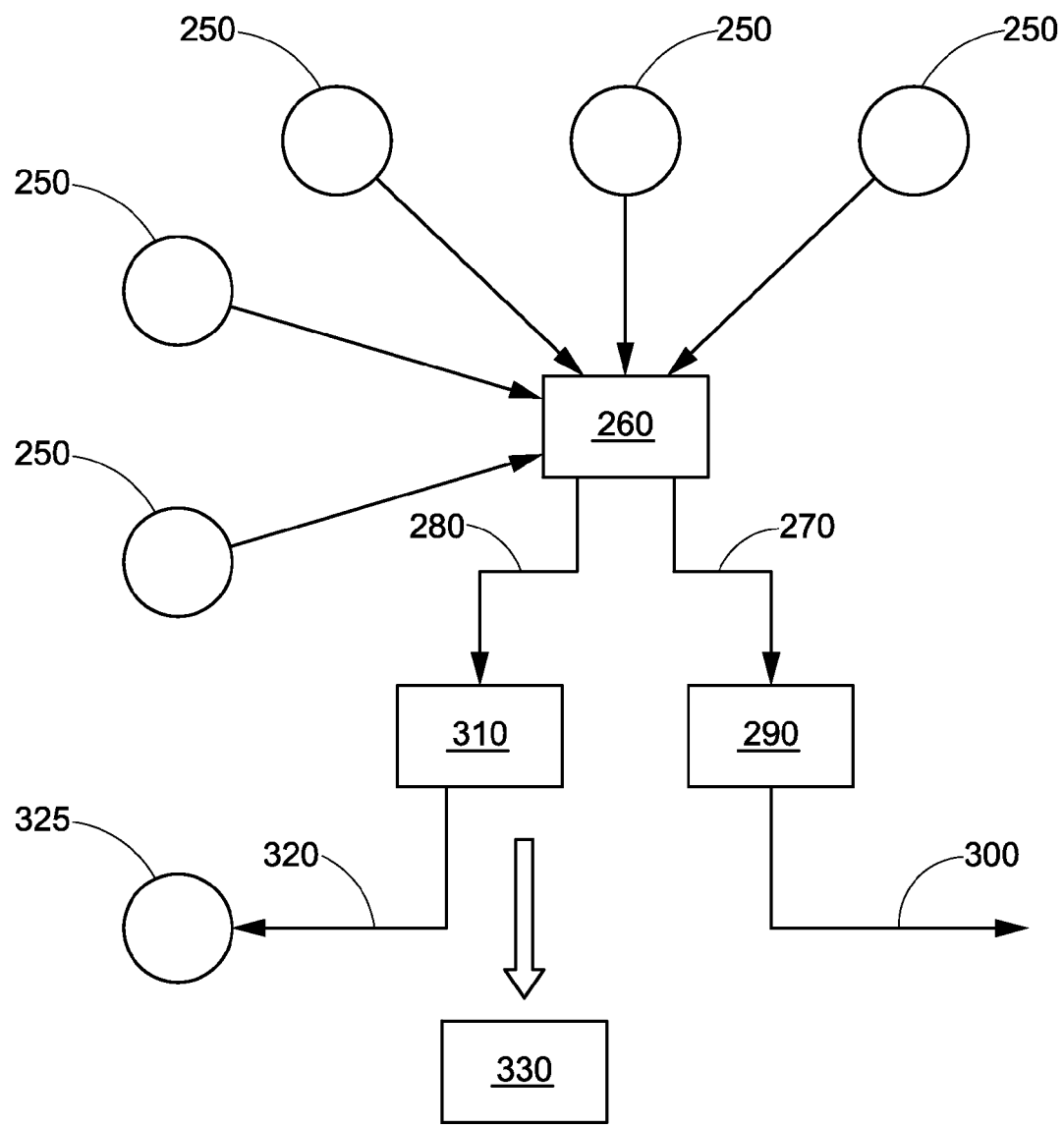
FIG. 8 is a material flowchart of the various components in the methods of the present disclosure.

FIG. 8 is a flowchart showing the overall flow of materials. Production wells 250 provide a mixture of natural gas and brine to a gas-liquid separator 260, which in turn forms two streams, a natural gas stream 270 and a brine stream 280. The natural gas stream 270 goes to a compressor 290 and then to market via a pipeline 300. The brine stream 280 is sent to a portable system 310, such as those described herein for separating iodine from the brine. The extracted brine 320 is sent to an injection well 325, or possibly for purification/sale for other uses, such as agriculture. The iodine-charged units are sent to a processing facility 330 where the iodine is extracted and the units are reused.

Figure 9:
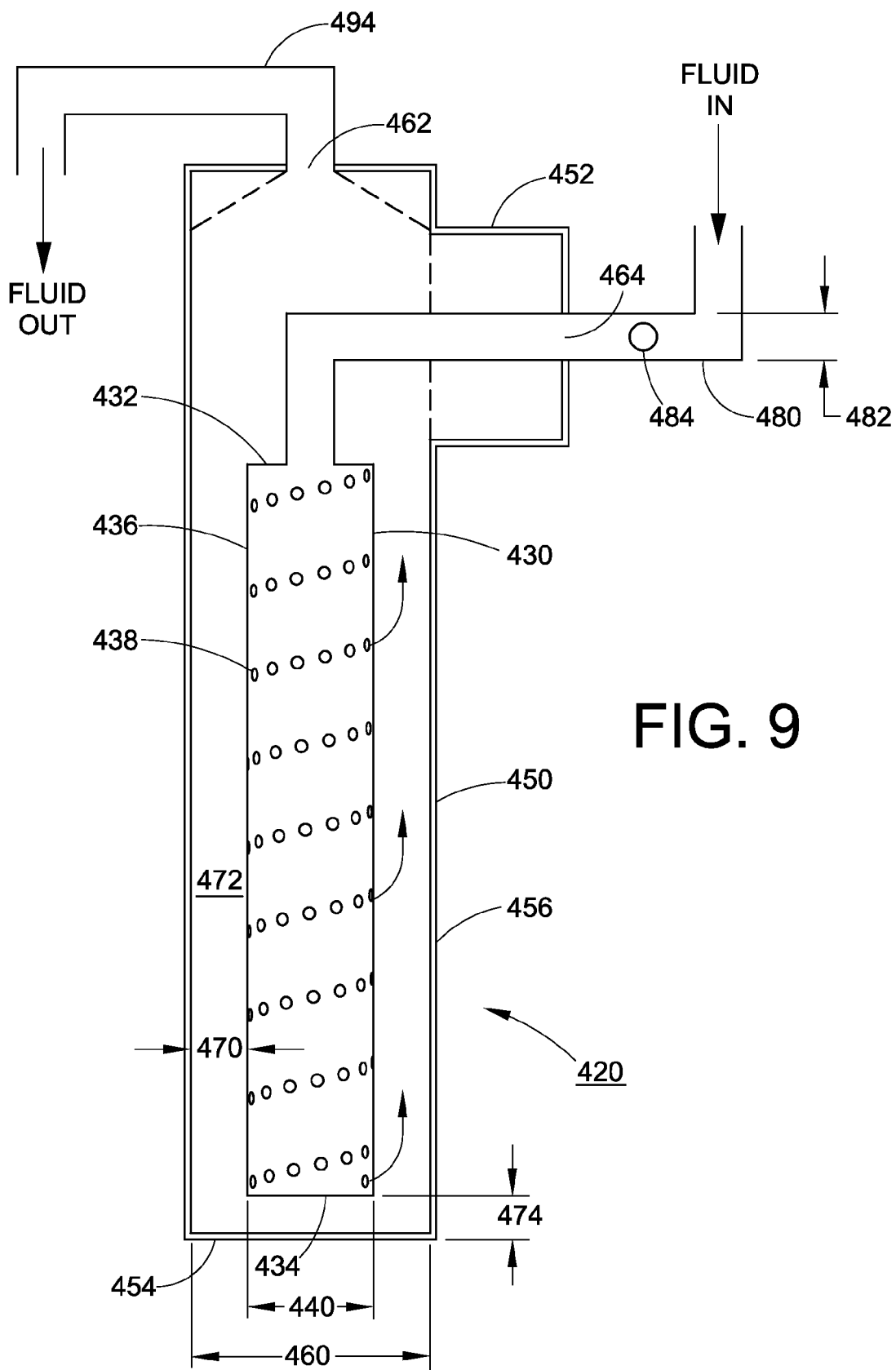
FIG. 9 is a side view of an exemplary in-line mixing apparatus useful in the portable system of the present disclosure.
Figure 10:
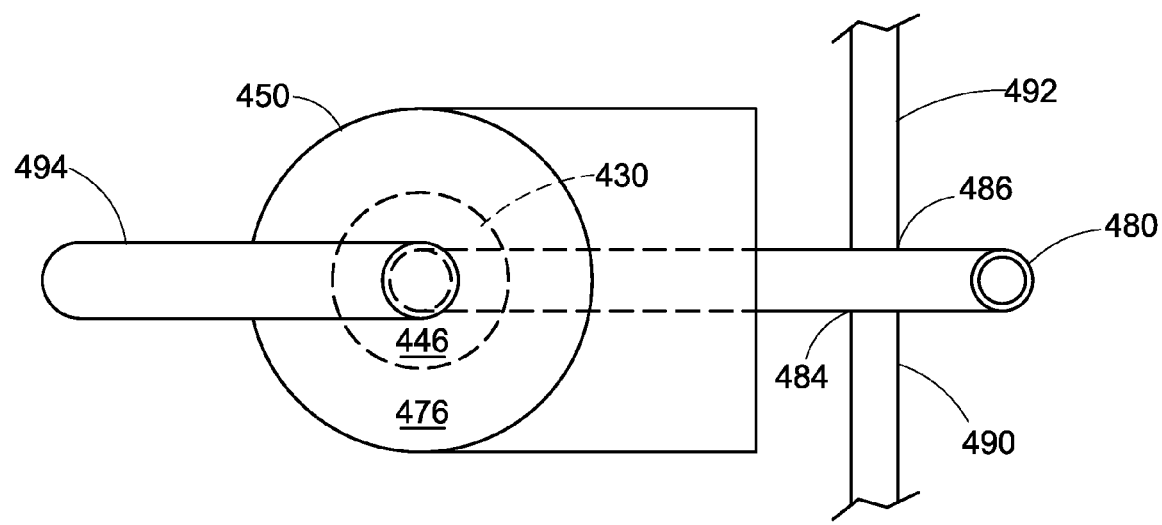
FIG. 10 is a top view of the exemplary apparatus of FIG. 9.

FIG. 9 is a more detailed side view of an in-line mixing apparatus which can be used as the treatment unit of the portable system, while FIG. 10 is a top view of the in-line mixing apparatus.

The apparatus 420 comprises a fluid processing system for conveying or transmitting a fluid such as an inner tube 430 and an outer tube 450.

The processing system or inner tube 430 comprises an inlet end 432, a closed end 434, and a sidewall 436. The sidewall 436 defines an interior volume for the inner tube. There are apertures, perforations, holes, or openings 438 through the sidewall 436 to connect the interior volume with the exterior of the inner tube, as will be explained further herein.

In particular embodiments, the openings all have the same size and shape. However, it is contemplated that the openings could vary independently in regards to size and shape, depending on the particular needs of the fluid process. As shown here, the openings are arranged in a helical pattern on the sidewall, which generally distributes the openings uniformly across the surface of the inner tube along both the length and the circumference. However, other patterns are also contemplated.

The outer tube 450 comprises an open end 452, a closed end 454, and a sidewall 456. The sidewall 456 also defines an interior volume for the outer tube.

The inner tube 430 is located inside the outer tube 450. Generally, they are placed to share a common axis, i.e. coaxially. As a result, there is a radial gap 470 between the inner tube and outer tube. When both tubes are cylindrical, an annular area is formed between the two tubes. As a result of this placement, an annular volume 472 is defined by the inner tube 430 and the outer tube 450. The term "annular," as used herein, only designates the area or volume between the inner tube 430 and the outer tube 450, and should not be construed as requiring the inner tube and outer tube to have a circular cross-section. The inner tube and outer tube generally have the same shape (e.g., having a circular cross-section). However, it is contemplated that they could have different cross-sectional shapes. In such an event, the radial gap would be the shortest distance between the inner tube and outer tube. However, the inner tube and outer tube generally should never touch, i.e. there should be a gap between them around the entire inner tube.

In embodiments, the closed end 434 of the inner tube 430 does not contact the closed end 454 of the outer tube 450. In other words, there is a longitudinal gap 474 at the end of the tube. The longitudinal gap 474 is generally equal to or less than the diameter 440 of the inner tube. The length of the inner tube 430 may vary somewhat with the diameter 440. For example, with an inner tube diameter of two inches, the length is approximately three feet; while for an inner tube diameter of four inches, the length is approximately four feet.

The total surface area of the openings 438 is, in embodiments, about equal to the cross-sectional area of the inner tube 430 itself. When this relationship is met, the velocity of the solution through each opening 438 is about equal to the velocity of the solution at the inlet end 432. For example, when the inner tube 430 has a diameter of two inches and each opening 438 has a diameter of 1/8 inches, there are a total of 60 to 65 individual openings. When the inner tube 430 has a diameter of four inches and each opening 438 has a diameter of 1/8 inches, there are a total of about 256 individual openings.

In embodiments, the cross-sectional area 476 of the annular volume 472 should be within an order of magnitude of the cross-section area 446 of the inner tube 430 in either direction (see FIG. 10), i.e. the ratio of the two cross-section areas is from 0.1 to 10. Again, it is generally desired that the velocity of the solution through the annular volume 472 is about equal to the velocity of the solution at the inlet end 432. However, in practice, tubes/pipes are usually only available with diameters in integral increments, such as 2 or 4 inches, not 2.5 inches. Thus, the ratio of the cross-sectional areas of the annular volume to the inner tube necessarily has greater variation.

As depicted in FIG. 9, the outer tube 450 has two openings 462, 464. One opening 462 is present in the open end 452 and one opening 464 is present in the sidewall 456. Generally speaking, the outer tube 450 has at least two openings, a "liquid feed" and a "liquid exit", for entry and exit of fluids. The two openings may be in any location that does not adversely affect the function of the apparatus 420. For example, both openings could also be in the sidewall 456.

Here, first feed tube 480 passes through opening 464 and forms a fluid communication with (i.e. is connected to) the inlet end 432 of the inner tube 430. Generally speaking, the three fluid streams (brine, bleach, and acid) are combined in feed tube 480 prior to being transferred to the inner tube 430. As the amount of NaOCl and acid will generally be less than the amount of brine, their feed lines may be smaller. For example, as depicted here in FIG. 9, feed tube 480 has a diameter 482, which may be about 2 inches, and through which the brine initially flows. There are two openings 484, 486 in the feed tube for addition of NaOCl and acid, which can have a diameter of about 0.5 inches.

FIG. 10 is a top view of the mixing apparatus of FIG. 9. The inner tube 430 is shown within the outer tube 450. The feed tube 480 for the brine and the two smaller feed lines 490, 492 for the NaOCl and the acid are also visible. An exit tube 494 is attached to the open end 452 of the outer tube.

Referring again to FIG. 9, the in-line mixing apparatus is used to mix the brine, NaOCl, and acid. Feed tube 480 passes through opening 464 and connects to inlet end 432 of inner tube 430. As depicted here, the brine, NaOCl, and acid are mixed in the feed tube prior to entering the inner tube. However, it is also contemplated that feed tube 480 could act as a jacket for three separate feed lines and that the brine, NaOCl, and acid are not mixed until after entering the inner tube 30.

The brine, NaOCl, and acid solution enters the inner tube 430 under pressure, supplied for example by a pump (not shown) or by the artesian brine source. They then flow downwards through the inner tube 430 and out the openings 438 into the annular volume 472 under pressure. It should be kept in mind that during constant operation, annular volume 472 is full of solution as well. The resulting cascade of fluid being expelled from the inner tube 430, combined with impingement against the outer tube 450 and turbulence due to fluid flowing from closed end 454 upwards towards open end 452, causes thorough mixing of the brine, NaOCl, and acid to occur throughout the volume of fluid. Put another way, the initial downward flow of the solution at the inlet end 432 is continually and abruptly changed as the solution flows out the openings 438, wherein they encounter a counter-current upward flow. Each of the flow streams exiting the inner tube through openings 438 experiences continuous, instantaneous, and massive flow shear as a result, causing intimate mixing with little plug flow or laminar flow.

Exit tube 494 is attached to or passes through opening 462 on open end 452. The mixed fluid rises throughout the column and exits the apparatus 420 through exit tube 494.

The portable system is readily mobile. All that is required is to transport the portable system to the gas well location, hook up the various hoses, and provide a simple electrical supply if needed. The capital expenditures for the portable system is also very favorable compared to those for a centralized processing facility and pipelines to the gas wells.

It is contemplated that the portable system can be controlled or automated using a controller or computer system which is connected to various sensors. For example, a pH sensor can be used to monitor the pH of the fluid stream in the treatment unit and adjust the amount of acid as needed. One or more colorimetric sensors, such as a spectrophotometer, can also be used to determine the amount of elemental iodine exiting the treatment unit, entering the adsorption unit, and/or exiting the adsorption unit. These sensors can notify operators of various conditions, for example that the adsorption unit has reached its maximum capacity and needs replacement.

The use of an in-line mixing apparatus as described herein also offers many advantages over conventional equipment. Compared to a conventional tank with agitator, the in-line mixing apparatus functions via pressure differential which is typically provided by natural flow or other equipment. As a result, no mechanical moving parts are required, no wearing out of mechanical equipment occurs, and very little maintenance or labor costs are required. Little or no sound is produced during use. There is little or no electrical power requirement, so the mixing apparatus can be used in remote areas. It is easily modified for use with hazardous or corrosive materials. The mixing apparatus has a much smaller footprint than a conventional mixing tank. Processing capacity is easily adjusted by either adding more apparatuses to a given tandem design (series or parallel) or by increasing the diameter of the mixing apparatus to increase the throughput. The design is simple and easy to understand. Contrary to a mixing tank, the mixing improves as the throughput increases. Because the mixing apparatus is sealed and self-contained, there is no possibility of hazardous vapors (such as hydrocarbons) escaping from the fluid and no need for air exchange to prevent explosive conditions around the mixing apparatus. The apparatus is easily cleaned by a contained flush, without the need to enter a mixing vessel for maintenance or cleaning. The mixing apparatus can be mounted in any direction or configuration as well, and can be moved or replaced within minutes.

The apparatuses and methods of the present disclosure have been described with reference to exemplary embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method of extracting iodine from a fluid stream, comprising:
   providing a portable system to a first location, the portable system comprising a mobile platform, a treatment unit capable of oxidizing iodine ions in a solution into elemental iodine, and a first adsorption unit capable of adsorbing iodine;
   wherein the treatment unit is an in-line mixing apparatus comprising:
      a cylindrical outer tube comprising a sidewall, a closed end, an open end opposite the closed end, a first opening in the open end, and a second opening in the sidewall adjacent the open end;
      a cylindrical inner tube comprising an inlet end, a closed end, and a sidewall, the sidewall having openings therein, the inner tube being located coaxially inside the outer tube and having a cross-sectional area, and the inlet end of the inner tube being adjacent to the open end of the outer tube;
      wherein the outer tube closed end is adjacent the inner tube closed end, the outer tube closed end and the inner tube closed end being separated by a longitudinal gap so that the inner tube closed end does not contact the outer tube closed end;
      a first feed tube connected to the inlet end of the inner tube and passing though the second opening, the first feed tube receiving the fluid stream; and
      an exit tube for the fluid stream connected to the first opening in the outer tube;
   wherein the first location provides at least one fluid stream containing iodine;
   separating the iodine from unwanted material in the at least one fluid stream by passing the at least one fluid stream through a separator;
   passing the at least one fluid stream through the treatment unit, and the first adsorption unit to accumulate the iodine in the first adsorption unit, the at least one fluid stream entering the in-line mixing apparatus through the first feed tube and exiting the in-line mixing apparatus through the exit tube;
   transporting the first adsorption unit to a second location; and
   extracting the iodine from the first adsorption unit at the second location.

2. The method of claim 1, wherein the at least one fluid stream containing iodine is provided by a separator capable of separating natural gas from brine.

3. The method of claim 1, further comprising returning the at least one fluid stream to the first location after passing through the adsorption unit.

4. The method of claim 1, further comprising:
   dividing the at least one fluid stream into a first portion and a second portion;
   passing the first portion through an electrolytic cell to form sodium hypochlorite; and
   re-combining the first portion, the second portion, and an acid together into a fluid stream.

5. The method of claim 1, wherein the iodine is extracted by passing an oxidizing solution through the first adsorption unit to obtain elemental iodine.

6. The method of claim 1, further comprising passing sulfur dioxide gas and water through the first adsorption unit to obtain hydrogen iodide.

7. The method of claim 6, further comprising oxidizing the hydrogen iodide to obtain elemental iodine.

8. The method of claim 1, wherein the portable system further comprises a second adsorption unit;
   wherein the first adsorption unit and the second adsorption unit are placed in series or parallel,
   and wherein the at least one fluid stream is passed through the treatment unit, the first adsorption unit, and the second adsorption unit.

9. The method of claim 1, wherein the inner tube sidewall openings are arranged in a helical pattern on the inner tube sidewall.

10. The method of claim 1, wherein an annular volume is defined between the inner tube and the outer tube, and a cross-sectional area of the annular volume is within an order of magnitude of the cross-sectional area of the inner tube.

11. The method of claim 1, wherein the longitudinal gap is equal to or less than a diameter of the inner tube.

\* \* \* \* \*